(12) United States Patent
He et al.

(10) Patent No.: US 7,612,794 B2
(45) Date of Patent: Nov. 3, 2009

(54) SYSTEM AND METHOD FOR APPLYING DIGITAL MAKE-UP IN VIDEO CONFERENCING

(75) Inventors: Li-wei He, Redmond, WA (US); Michael Cohen, Seattle, WA (US); Yong Rui, Sammamish, WA (US); Shinichi Manaka, Tokyo (JP)

(73) Assignee: Microsoft Corp., Redmond, WA (US)

( * ) Notice: Subject to any disclaimer, the term of this patent is extended or adjusted under 35 U.S.C. 154(b) by 899 days.

(21) Appl. No.: 11/137,252

(22) Filed: May 25, 2005

(65) Prior Publication Data

US 2006/0268101 A1 Nov. 30, 2006

(51) Int. Cl.
H04N 7/14 (2006.01)
G06K 9/00 (2006.01)

(52) U.S. Cl. ............... 348/14.08; 348/14.07; 348/348; 348/14.12

(58) Field of Classification Search ... 348/14.01–14.16; 382/118, 243
See application file for complete search history.

(56) References Cited

U.S. PATENT DOCUMENTS

| 6,278,491 | B1 * | 8/2001 | Wang et al. | 348/370 |
| 6,526,161 | B1 | 2/2003 | Yan | |
| 7,227,567 | B1 * | 6/2007 | Beck et al. | 348/14.07 |
| 2001/0037191 | A1 | 11/2001 | Furuta et al. | |
| 2004/0114731 | A1 * | 6/2004 | Gillett et al. | 379/88.03 |
| 2004/0170337 | A1 * | 9/2004 | Simon et al. | 382/254 |
| 2004/0218827 | A1 | 11/2004 | Cohen et al. | |
| 2006/0001673 | A1 * | 1/2006 | Brand | 345/582 |
| 2008/0158333 | A1 * | 7/2008 | Krisbergh et al. | 348/14.01 |

OTHER PUBLICATIONS

European Search Report, Application No. PCT/US06/14268, Date of Completion: May 29, 2007, Date of Mailing Nov. 6, 2007.

Connell, J., A. W. Senior, A. Hampapur, Y.-L. Tian, L. Brown and S. Pankanti, Detection and Tracking in the IBM PeopleVision system, IEEE Int'l Conf. on Multimedia and Expo, 2004, vol. 2, pp. 1403-1406.

Elgammal, A., D. Harwood, and L.S. Davis, Non-parametric model for background subtraction, European Conf. on Comp. Vision, 2000, pp. 751-767.

(Continued)

*Primary Examiner*—Melur Ramakrishnaiah
(74) *Attorney, Agent, or Firm*—Lyon & Harr, LLP; Katrina A. Lyon (57) ABSTRACT

A method of digitally adding the appearance of makeup to a videoconferencing participant. The system and method for applying digital make-up operates in a loop processing sequential video frames. For each input frame, there are typically three general steps: 1) Locating the face and eye and mouth regions; 2) Applying digital make-up to the face, preferably with the exception of the eye and open mouth areas; and 3) Blending the make-up region with the rest of the face. In one embodiment of the invention, the background in the frame containing a video conferencing participant can also be modified so that other video conferencing participants cannot clearly see the background behind the participant in the image frame. In one such embodiment of the invention, the video conferencing participant tries to make his or her own image look comical or altered. In another embodiment of the invention, a particular remote participant tries to make another participant look funny to the other participants.

19 Claims, 9 Drawing Sheets

OTHER PUBLICATIONS

Friedman, N., and S. Russell, Image segmentation in video sequences: A probabilistic approach, Proc. of the 13th Conf. on Uncertainty in Artificial Intelligence, 1997, pp. 175.181.

Harville, M., A framework for high-level feedback to adaptive per-pixel, mixture-of-Gaussian background models, European Conf. on Comp. Vision, 2002, vol. 3, pp. 543-560.

Kolmogorov, V., A. Criminisi, A. Blake, G. Cross and C. Rother, Bi-layer segmentation of binocular stereo vision, Comp. Vision and Pattern Recognition, 2005, vol. 2, pp. 407-414.

Logitech Video Effects, http://www.logitech.com/index.cfm/products/videoeffects/information/US/EN,CRID=2448,CONTENTID=11070.

Lou, H., and A. Eleftheriadis, Model-based segmentation and tracking of head-and-shoulder video objects for real time multimedia services, IEEE Trans. on Multimedia, Sep. 2003, vol. 5, No. 3, pp. 379-389.

Mittel, A., and N. Paragois, Motion-based background subtraction using adaptive kernel density estimation, Comp. Vision and Pattern Recognition, 2004, pp. 302-309.

Rittscher, J., J. Kato, S. Joga, and A. Blake, A probabilistic background model for tracking, European Conf. on Comp. Vision, 2000, vol. 2, pp. 336-350.

Stauffer, C., and W. E. L. Grimson, Adaptive background mixture models for real-time tracking, Comp. Vision and Pattern Recognition, 1999, vol. 2, pp. 246-252.

Toyama, K., J. Krumm, B. Brumitt and B. Meyers, Wallflower: Principles and practice of background maintenance, Proc. 7th Int'l Conf. on Comp. Vision, Sep. 1999, pp. 255-261.

Viola, P., and M. Jones, Rapid object detection using a boosted cascade of simple features, Comp. Vision and Pattern Recognition, 2001, Kauai, HI, vol. 1, pp. 511-518.

Wang, J. Y. A., and E. H. Adelson, representing moving images with layers, IEEE Trans. on Image Processing, 1994, vol. 3, No. 5, pp. 625-638.

Wren, C., A. Azarbayejani, T. Darrel, and A. Pentland, Pfinder: Real time tracking of the human body, IEEE Trans. on PAMI, 1997, vol. 19, No. 7, pp. 780-785.

Xiao, J. J., and M. Shah, Motion layer extraction in the presence of occlusion using graph cut, Comp. Vision and Pattern Recognition, 2004, vol. 2, pp. 972-979.

Xiao, R., M.-J. Li and H.-J. Zhang, Robust multi-pose face detection in images, IEEE Trans. on CSVT, Jan. 2004, vol. 14, No. 1, pp. 31-41.

Zhang, C., and Y. Rui, Robust visual tracking via pixel classification and integration, Proc. of the 18th Int'l Conf. on Pattern Recognition, 2006, vol. 3, pp. 37-42.

* cited by examiner

SYSTEM AND METHOD FOR APPLYING DIGITAL MAKE-UP IN VIDEO CONFERENCING

BACKGROUND

1. Technical Field

The invention is related to video conferencing, and in particular, to a system and method for applying digital make-up to images of a video conferencing meeting participant.

2. Related Art

With the increasing availability of the on-line communication applications and broadband internet access, communicating with friends and family using real-time audio and video is becoming more and more popular.

Unlike in audio-only communication, where the appearance of the participant, or the participant's environment, is not at all important, the participant in a video conference often makes a great effort to look his or her best prior to commencing it. In some societies, women feel compelled to apply make-up before appearing on camera, just as they would before going out for any other social activities. In addition, while talking on the telephone in a cluttered or messy room is not bothersome to most people, having family members or business associates view such a situation in the background of a video conference is undesirable to many people.

Therefore, what is needed is a system and method that can provide face-to-face video conferencing that improves the appearance of video conferencing participants, and possibly their environment, without requiring these participants to expend time and effort in putting on make-up or cleaning up their space.

SUMMARY

The foregoing needs are met by a system and method for applying digital make-up. This system and method applies make-up to human faces in a captured video stream digitally so that the video conference participant can always look his or her best. This system and method for applying digital make-up takes away the psychological burden of applying make-up before appearing in front of the camera. In one embodiment, the background behind the meeting participant is also modified (for example, by blurring or deleting it) to preclude the need for tidying up the conferencing space. This makes video conferencing as effortless as picking up a telephone and talking. The digital make-up system and method of the invention has the potential to make video conferencing applications as popular and ubiquitous as the telephone.

In one embodiment of the invention, a video conferencing application is hosted on a Personal Computer (PC) or other computing device (e.g., a game console for example), which acquires video frames of a video conferencing participant from an attached camera source. Make-up is applied to the face and then this image frame is encoded using a compression algorithm. Various conventional compression algorithms can be used for this purpose, such as H.263, H.264, or MPEG2 or MPEG4 compression standards (or a specialized compression algorithm can be used). Once the make-up is applied, the system and method of the invention sends the image with the make up applied (e.g., made-up image frame) to one or more remote video conference participants over a network. If necessary, the image data can be packetized into packets prior to sending it to the network, such as the Internet. The receiving participants decode the video frame to recover the made-up image frame and display it as they normally would any received video frame. In this embodiment a digital make-up module for applying digital make-up is inserted between the camera source and the encoding module. However, other types of configurations are possible. For instance, in one embodiment a receiving video conferencing participant receives a compressed or encoded image of another meeting participant from that participant and decodes it, applies the digital make-up and displays the image. In yet another embodiment, one video conferencing participant captures an image of themselves, encodes it and sends it to a server. The server decodes this image, applies the digital makeup, encodes the image with the digital make-up and transmits this image to one or more video conferencing participants. These video conferencing participants then simply decode the image and display it.

The module or method for applying digital make-up in all of the above-discussed embodiments operates in a loop processing sequential video frames. For each input frame, there are typically three general steps: 1) Locating the face and eye and mouth regions; 2) Applying digital make-up to the face, preferably with the exception of the eye and open mouth areas; and 3) Blending the make-up region with the rest of the face. These steps are discussed in further detail below.

Initially, the face and the features of the face, such as the eye and mouth regions are located in a given input frame. The face can be found by conventional or specialized face tracking algorithms and procedures. Many of these algorithms run an expensive human face finding algorithm for the initial few frames, and then run a lightweight tracking algorithm incrementally for the subsequent frames. The amortized CPU cost for this type of face finding is low on modern PC processors. Face finding can also be assisted by such well known imaging techniques such as edge detection and motion detection. Once the face is found, the eye and mouth regions are also identified by any of a number of methods known by those with ordinary skill in the art. For example, the eye regions can be identified by template matching. Eye tracking algorithms can also be used to locate the eyes. Edge or corner detection methods can also be used to identify the desired features of the eyes and the mouth.

Once the face and eyes and mouth are found, digital make-up is applied to the face, not applying make-up to the eye areas and the open mouth, thereby creating a mask. A typical make-up operation is accomplished by applying a bilateral filter to the mask area and then increasing the brightness. This filtering operation serves to smooth out the skin tone and remove imperfections without overly blurring across edges. Areas such as the lips and cheeks can also be color adjusted to make them more appealing. For example, the pixels of the lips and the cheeks can be made redder or rosier. Additionally, eye liner and eye shadow can be applied around the eye areas by changing the color of the pixels in these areas to enhance the beauty of the eyes.

Once the make-up has been applied, the made up mask region is blended with the rest of the face/head. Typically a feathering operation is performed between the original image and the mask for the made-up image to accomplish this blending.

In one embodiment of the invention, the background in the frame containing a video conferencing participant can also be modified so that other video conferencing participants cannot clearly see the background behind the participant in the image frame. This embodiment is useful when a room is messy or cluttered or contains items that the video conferencing participant in the image does not want the other participants to see. The background can be modified by blurring the background, or the background can simply be made a given color, another background video, or be deleted.

Typically, the digital make-up is applied to the local video frame stream. The remote participants are not permitted to see the original video which serves the original purpose of improving the looks of the video conferencing participant and their environment quite well. There are, however, some embodiments of the invention wherein the digital make-up is used for fun rather than for beautification.

In one such embodiment of the invention, the video conferencing participant tries to make his or her own image look comical or altered. There can be a variety of image transformations employed for this purpose. For example, one can make one's face red or purple, add a crown or a pair of eye glasses, and so on. In this embodiment, the image transformation module is disposed in the same place as the original make-up module in the previously discussed embodiments.

In another embodiment of the invention, a particular remote participant tries to make another participant look funny to the other participants. In this case, the transformation module is inserted after the video frame is decoded for each participant. Step 1 (face location/separation of the foreground from the background) is run on the PC of the participant who initiates the operation. Once the face region is known, its mask along with the command of the transformation is sent to every other participant. Steps 2 and 3 (e.g. transforming the face in a manner similar to the procedure of applying digital make-up and blending the transformed face with the surrounding face, respectively) are performed at every participant according to the transformation command.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
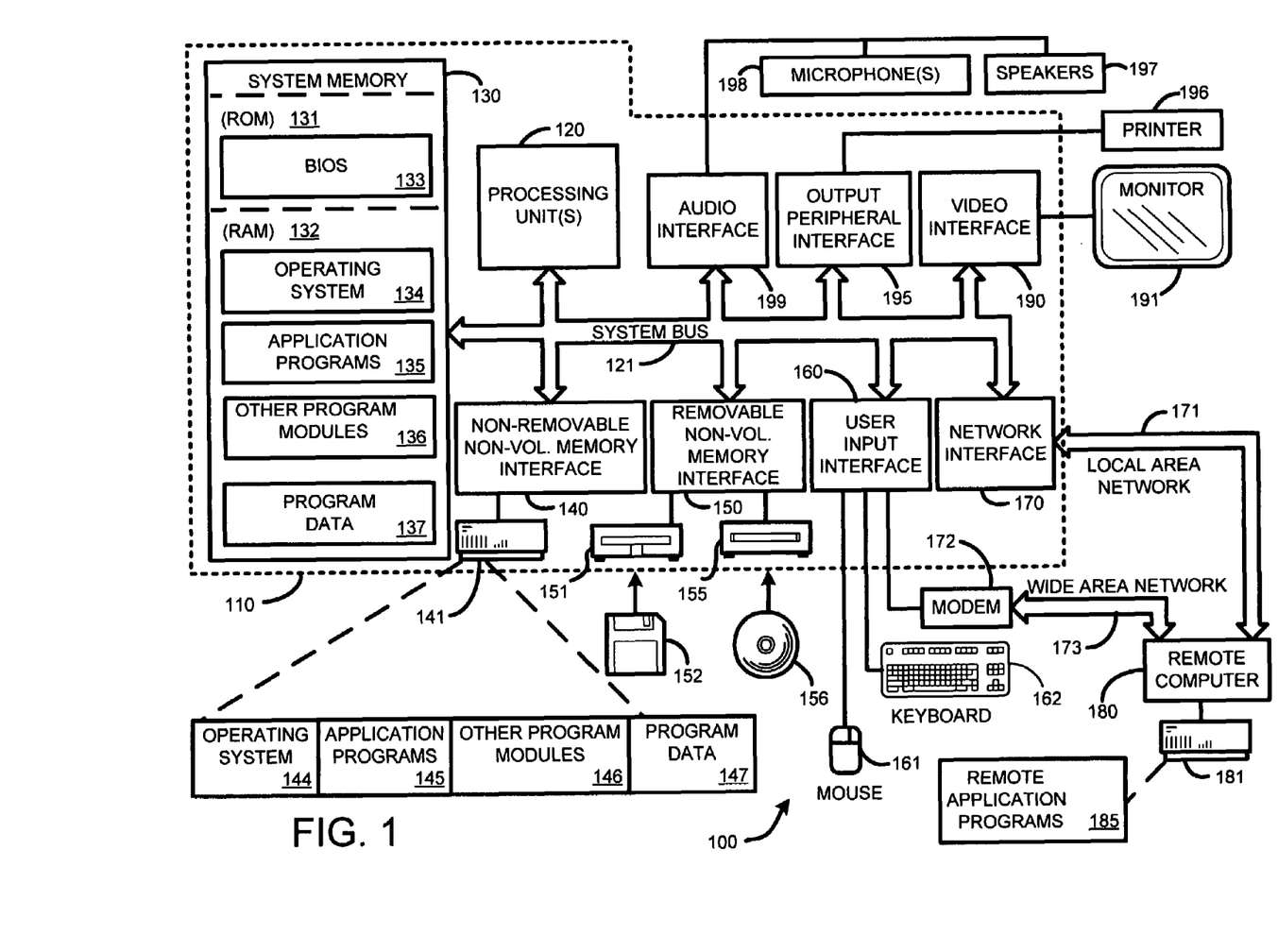
FIG. 1 is a general system diagram depicting a general-purpose computing device constituting an exemplary system wherein the system and method of the invention can be practiced.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the system and method of applying digital make-up of the invention.

2.0 A System and Method for Applying Digital Make-Up in Video Conferencing.

2.1 System Overview.

The system for applying digital make-up of the invention applies make-up to faces in a video frame digitally so that the video conference participant can always look his or her best.

The digital make-up system can be deployed in various configurations. For example, in one embodiment, shown in FIG. 2A, an image is input into a video conferencing participant's computing device 202a from a camera 204a, and the digital make-up module 208a for applying digital make-up is inserted between the camera 204a and the encoding module 210a. In this embodiment, the encoded output image is transmitted to one or more receiving video conference participants 214a over a network 216a. The receiving participants 214a decode the transmitted encoded image via a is decoder 220a to recover and display the video of the output image with the make-up applied to their display 224a.

Figure 2A:
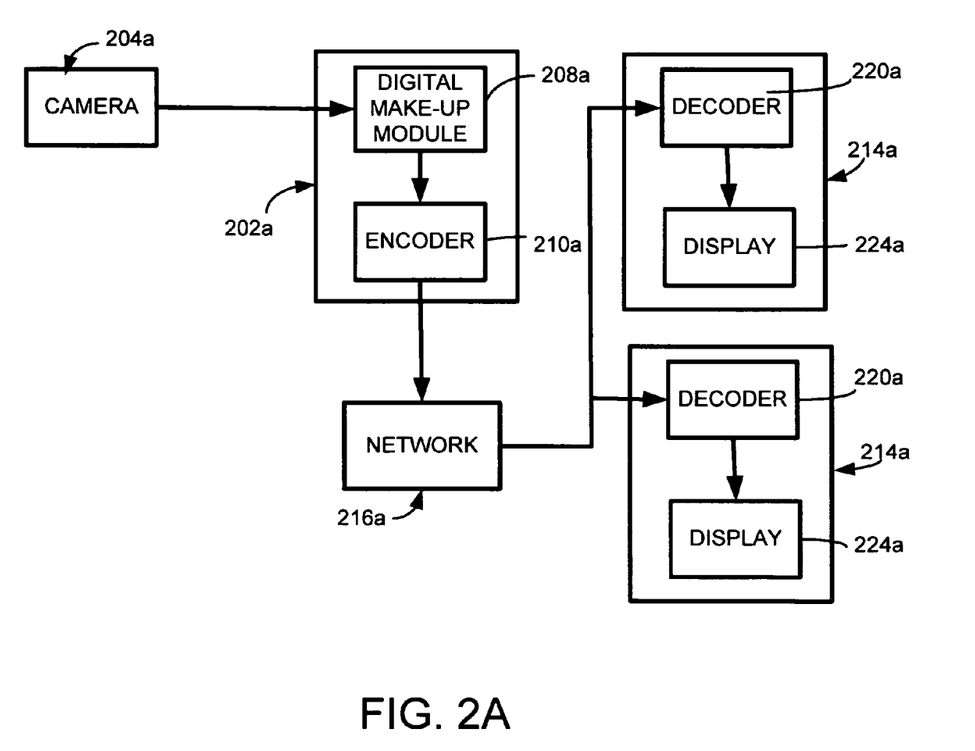
FIG. 2A is a schematic of one embodiment of the digital make-up system according to the invention wherein the make-up is applied at the computing device where the image is captured and then the made-up image is transmitted to other meeting participants.
Figure 2B:
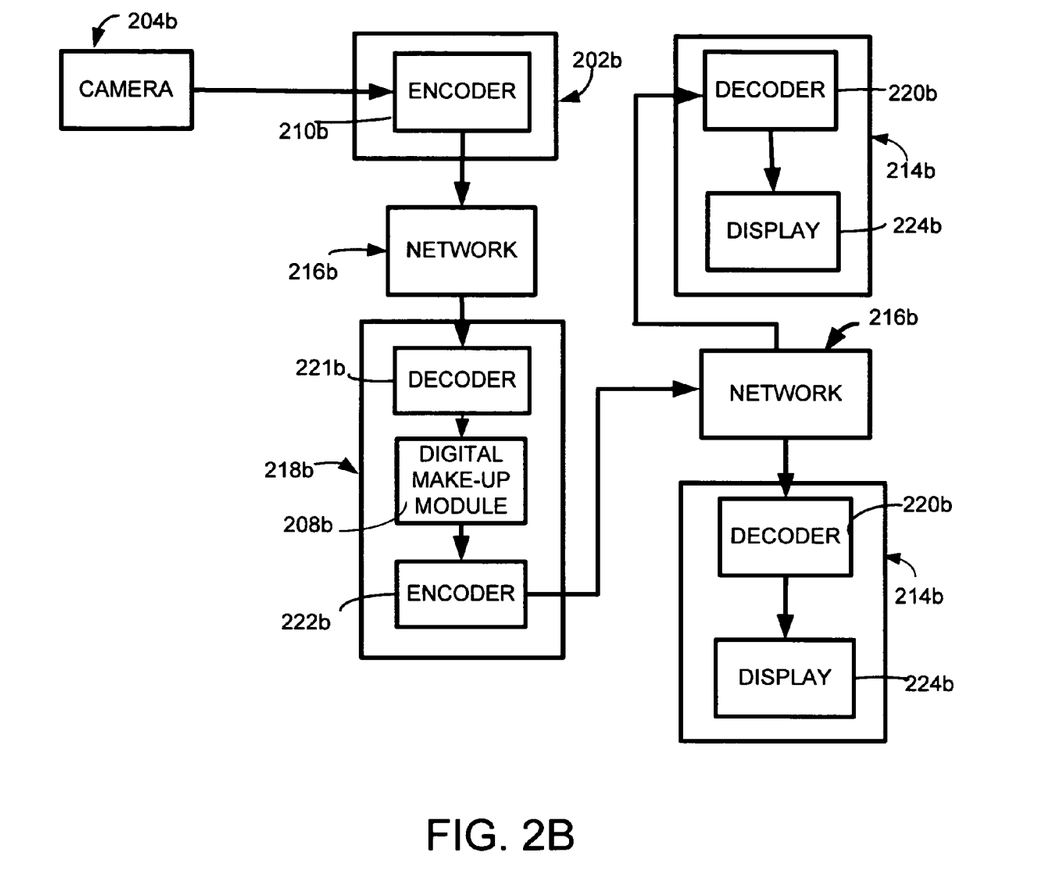
FIG. 2B is a schematic of another embodiment of the digital make-up system according to the invention wherein the make-up is applied at a server after the image is captured at one meeting participant and transferred to the server. The made-up image is then transmitted to other meeting participants by the server.

Alternately, as shown in FIG. 2B, the image of a video participant can be captured by a camera 204a, encoded by an encoding module 210b of the video participant's computing device 202b, and transmitted via a network 216b to a server 218b. The server 218b decodes the received image via a decoder 221b, applies the make up via a make-up module 208b, encodes the made-up image via an encoder 222b, and then transmits the encoded image of the person with the makeup applied to other video conferencing participants 214b over a network 216b. The made-up image also optionally be sent back to the participant who initially sent the image. The receiving video conferencing participants 214b decode the encoded image via a decoder 220b and display it on their display 224b.

Figure 2C:
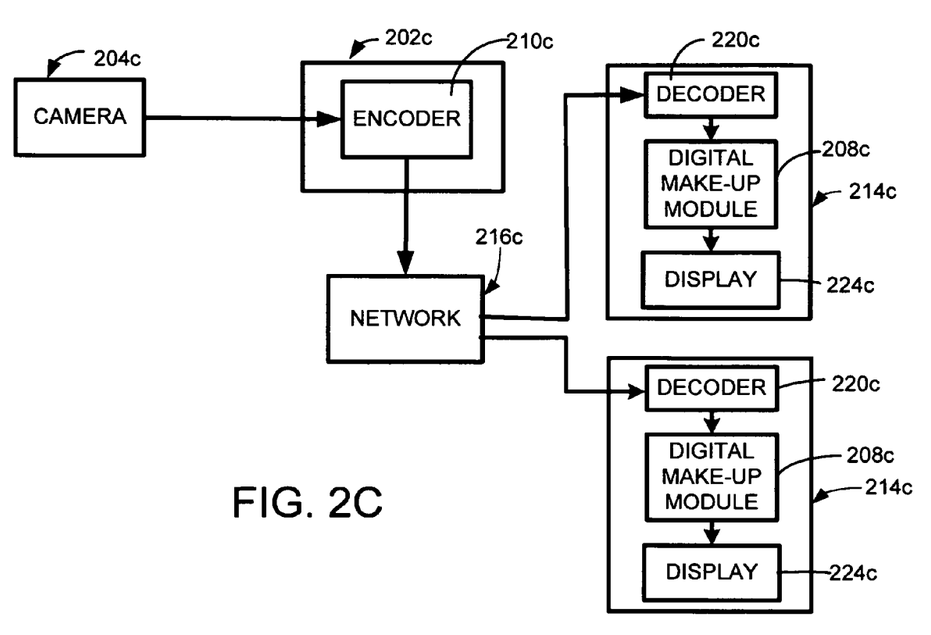
FIG. 2C is a schematic of yet another embodiment of the digital make-up system according to the invention wherein an image is captured at one meeting participant, encoded and then transmitted to one or more other video conferencing participants who decode it, apply the digital make-up and display the made-up image.

In yet another embodiment, shown in FIG. 2C, a video frame is captured at a video conferencing participant with a camera 204c and input into this video conferencing participant's computing device 202c. This video conferencing participant's computing device 202c encodes the image via an encoder 210c and transmits the encoded image to the other video conferencing participants 214c over a network 216c. The input image is received at each video conferencing participant 214c, decoded with a decoder 220c, make up is applied at the receiving video conferencing participant 214c via a digital make-up module 208cand the output image is displayed at the display 224c of this meeting participant.

2.2 Method Overview.

Some of the different system configurations having been described, the methods of operation for the previously-described embodiments will be discussed. It should be lo noted, however, that other embodiments of the digital make-up system of the invention are possible.

Figure 3:
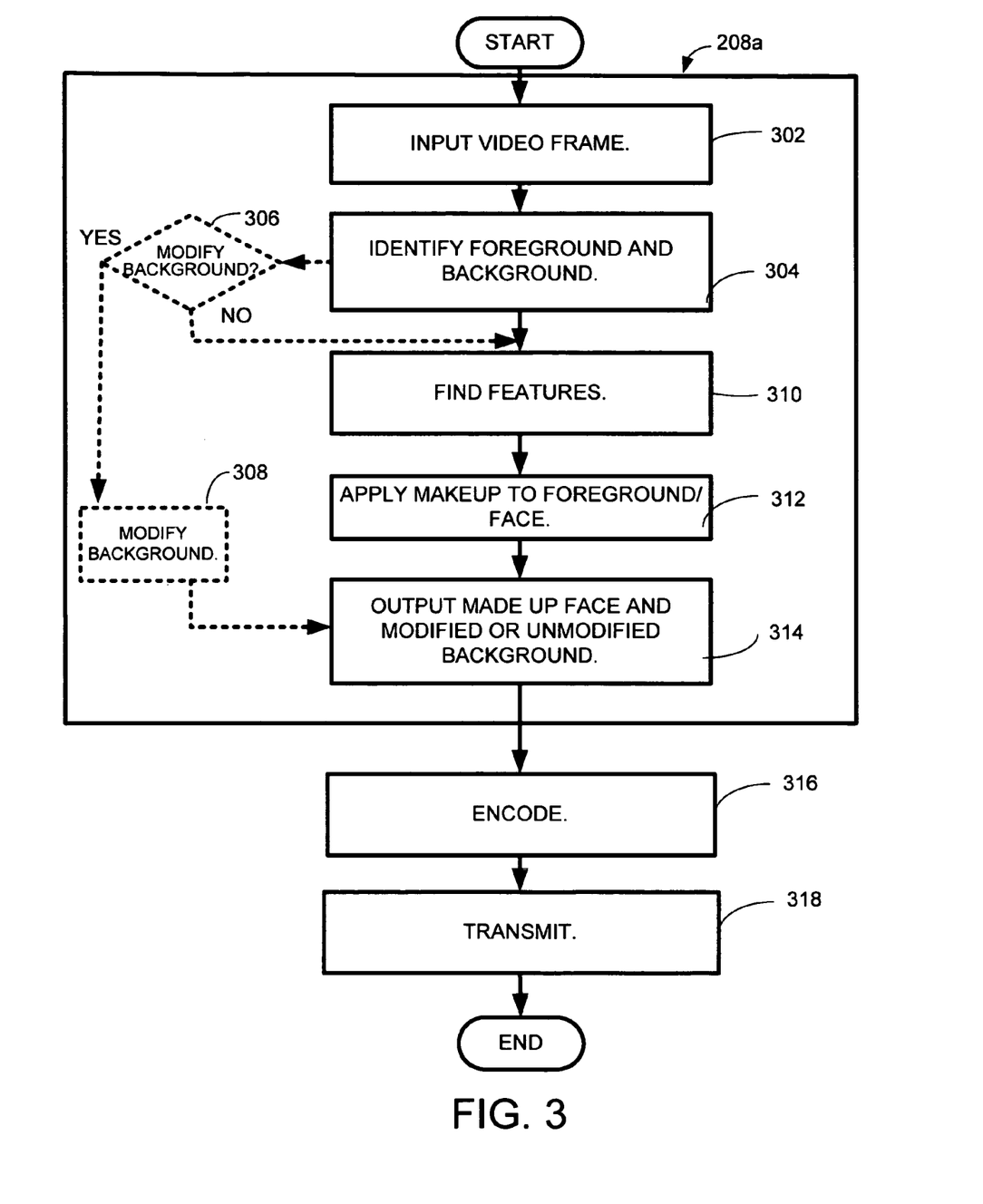
FIG. 3 illustrates an exemplary flow diagram of one embodiment of the digital make-up method according to the invention wherein the make-up is applied and then transmitted to other video conferencing participants.

For the configuration shown in FIG. 3, which is based on the system configuration shown in FIG. 2A, the system for applying digital make-up acquires a video frame (process action 302). The system and method for applying digital make-up is then identifies the foreground and background in the image (process action 304) wherein the foreground is a face. If a background modification is desired, the system for applying digital make-up can optionally blur the background or modify it in some other way (process actions 306, 308). The digital make-up system then finds the features in the face (process action 310) and applies make-up to the face (process action 312). An output image is then produced that contains the made-up face. This image may also have a blurred background or otherwise modified background if desired (process action 314). The image of the face with the make-up applied can then be encoded in a video stream using a compression algorithm via conventional means (process action 316). Various conventional compression algorithms can be used for this purpose, such as H.263, H.264, or MPEG2 or MPEG4. The digital make-up system then finally sends the modified image frame to one or more remote participants over a network (process action 318) who decode it and process it as they would any conventional video frame. The image data can be packetized prior to transmission if necessary.

Figure 4:
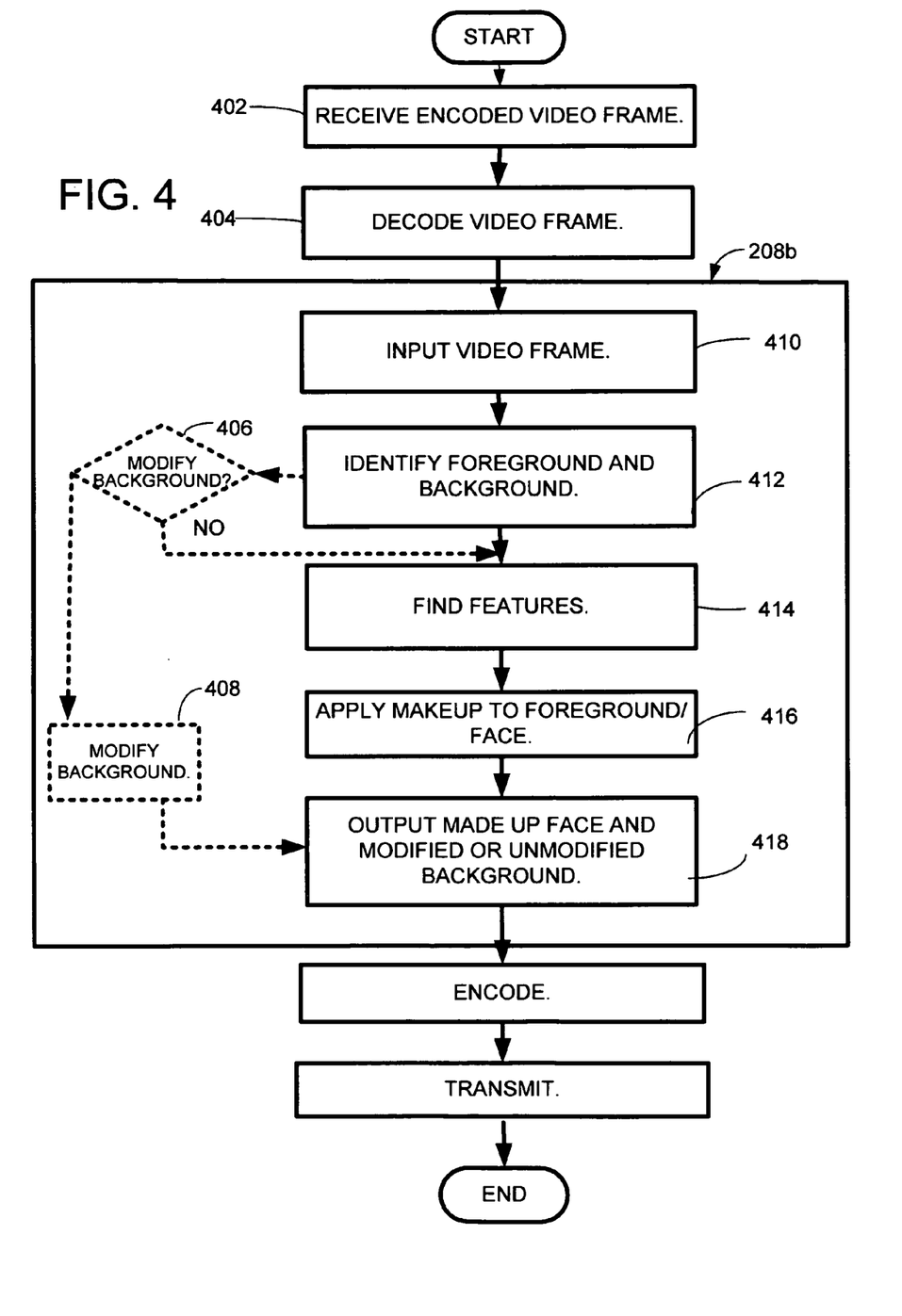
FIG. 4 illustrates an exemplary flow diagram of another embodiment of the digital make-up method according to the invention wherein the make-up is applied by a server and then transmitted to other video conferencing participants.

For the configuration as shown in FIG. 4, which is based on the system configuration shown in FIG. 2B, an encoded video frame is received at a server (process action 402). The server decodes the encoded video frame (process action 402) and inputs it into the module for applying digital make-up (process action 410). The module for applying digital make-up then identifies the foreground and background in the image (process action 412) wherein the foreground is a face. If a background modification is desired, the module for applying digital make-up can optionally blur the background or modify it in some other way (process actions 406, 408). The digital make-up module of the server then finds the features in the face (process action 414) and applies make-up to the face (process action 416). An image is then produced that contains the made-up face. This image may also have a blurred background or otherwise modified background if desired (process action 414). The face with the make-up applied can then be encoded in a video stream using a compression algorithm via conventional means (process action 420). The server make-up system then finally sends the modified image frame to one or more remote participants over a network (process action 422) who can decode and display the modified image on the display of their computing device. The image data can be packetized prior to transmission if necessary.

Figure 5:
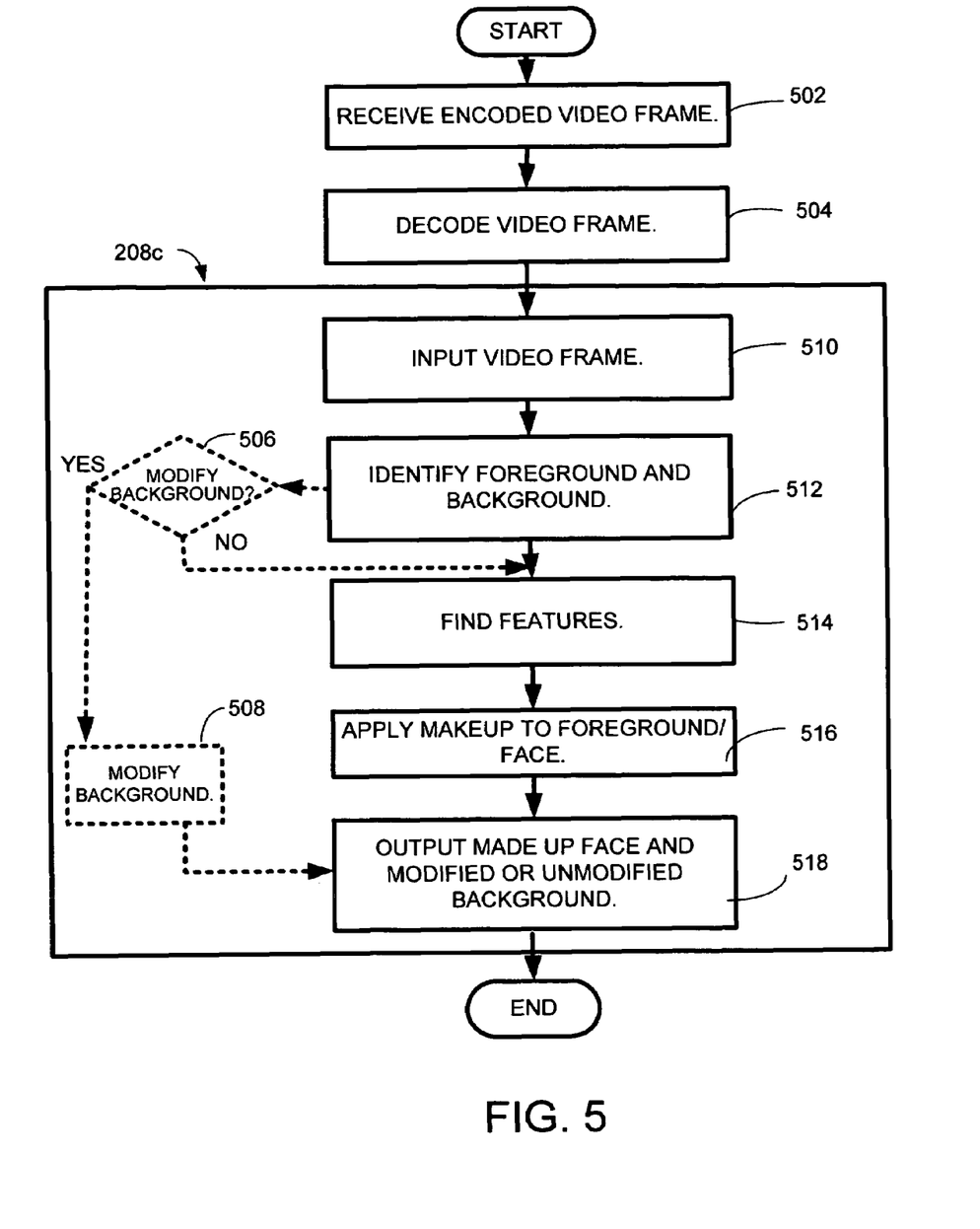
FIG. 5 illustrates another exemplary flow diagram of yet another embodiment of the digital make-up method according to the invention wherein the make-up is applied by video conferencing participants after the image has been transmitted and received.

For the configuration shown in FIG. 5, which is based on the system configuration shown in FIG. 2C, the system for applying digital make-up acquires an encoded video frame without make-up applied that is transmitted over a network (process action 502). The computing device of the video conferencing participant decodes the encoded frame and inputs it into the module for applying digital make-up (process action 510). This module then identifies the foreground and background in the image (process action 512) wherein the foreground is a face. If a background modification is desired, the module for applying digital make-up can optionally blur the background or modify it in some other way (process actions 506, 508). The digital make-up module then finds the features in the face (process action 514) and applies make-up to the face (process action 516). An output image is then produced that contains the made-up face. This image may also have a blurred background or otherwise modified background if desired (process action 518). This image can then be displayed at the receiving video conferencing participant.

2.3 Details of the Digital Make-Up Application Operations.

The system and method for applying digital make-up operates in a loop. For each frame, there are typically three steps to applying digital make-up: 1) Locating the face and facial features; 2) Applying digital make-up to the face, preferably with the exception of the eye and open mouth areas; and 3) Blending the make-up region with the rest of the face. These steps are discussed in further detail below.

2.3.1 Locating the Face and the Eye and Mouth Regions.

Initially, the face, and then the features of the face, such as the eye and mouth regions, is located in a given input frame. The face is found by conventional face tracking algorithms and procedures (for example, as taught in Yunqiang Chen, Yong Rui and Thomas Huang, Mode-based Multi-Hypothesis Head Tracking Using Parametric Contours, *Proc. of IEEE Automatic face and gesture recognition* 2002, Washington D.C., May 20-21). Many of these face tracking algorithms run an expensive human face finding algorithm for the initial few frames, and then run a lightweight tracking algorithm incrementally for the subsequent frames. Motion detection algorithms and edge detection methods can also be used to assist in finding the face. Once the face is found, it can be identified as the foreground, while the remaining part of the given frame is the background. Background modification can also occur which will be discussed in more detail later.

Once the face is found, the eye regions are also identified by any of a number of methods known by those with ordinary skill in the art. For example, the eye regions can be identified by template matching. Eye tracking algorithms can also be used, or edge detection algorithms can be used to locate these features. Similarly, the mouth is also located within the face by methods similar to those discussed with respect to eye location.

2.3.2 Applying Make-up on the Face Area Sans the Eyes/Open Mouth.

Once the face and features are located, digital make-up is applied to the face while not applying make-up to the eye areas and the open mouth. The area of the face minus the eye and open mouth can be thought of as a mask. Obviously one would not want to apply make-up to the eyeballs or the teeth. In one embodiment, a typical make-up operation is accomplished by applying a bilateral filter to the mask, followed by a brightness increase. With a bilateral blur filter the edges in the image stay sharp, while the rest of the image is blurred. This operation serves to smooth out the skin tone and remove imperfections. Additionally, a contrast reduction filter can be applied to even out the shading across the face. Areas such as the lips and cheeks can also be color adjusted by changing the color of pixels of these features.

2.3.3 Blend the Make-up Region with the Rest.

Once the make-up has been applied to the mask area, a feathering operation is performed between the original image and the mask for the made-up image to blend the mask with the surrounding areas, such as the hairline, open mouth, eyes and so forth. The feathering operation is achieved by including a partial transparency term, or alpha mask, to pixels near the edge of the mask. The alpha for the edge pixels gradually transition from 1 on the interior to 0 at the edge. Then the feathering operation can be performed using standard alpha blending.

2.3.4 Modifying the Background.

In one embodiment of the invention, the background in the frame containing a video conferencing participant can also be modified so that other video conferencing participants cannot clearly see the background behind the participant in the image frame. This embodiment is useful when a room is messy or cluttered or contains items that the video conferencing participant in the image does not want the other participants to see. The background can be modified by blurring the background, or the background can simply be made a given color or be deleted. For example, the background could be blurred with a low pass filter such as a Gaussian blur filter that blurs less closer to the face in the image and blurs more as the distance from the face increases. Alternately, a different video background can be shown.

3.0 Alternate Embodiments.

In the above discussed embodiments of the invention, the digital make-up is applied to the local video stream. The remote participants are not permitted to see the original video which serves the original purpose of making the video participant look more appealing quite well. There are, however, some embodiments of the invention wherein the digital make-up is used for fun rather than for beautification.

Figure 6:
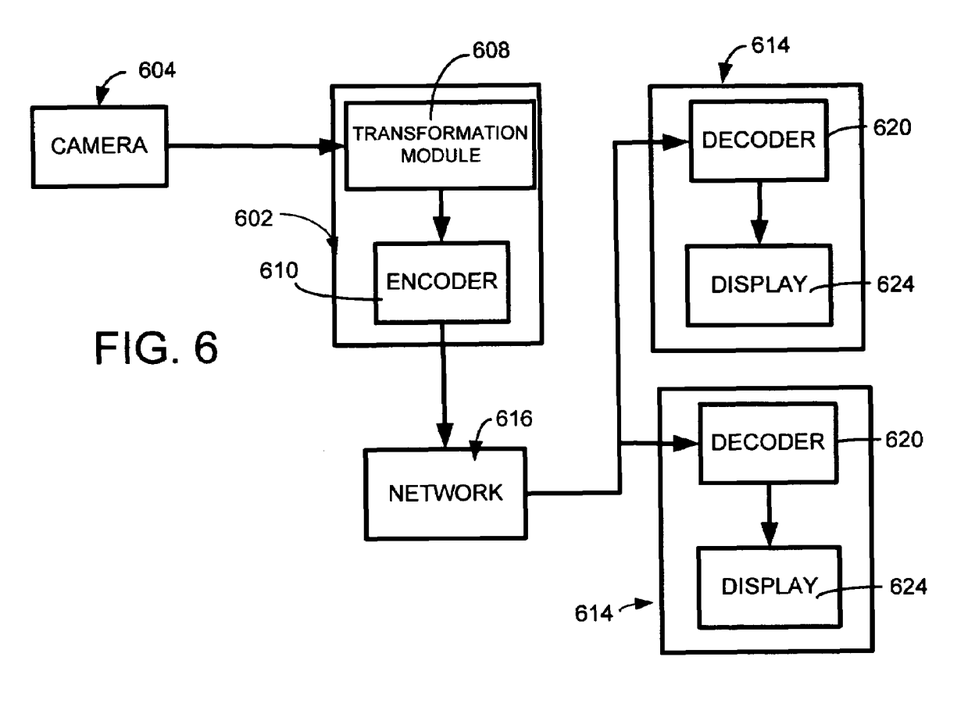
FIG. 6 is a schematic of an embodiment of a digital transformation system according to the invention wherein a face is transformed at the computing device where the image is captured and then the transformed image is transmitted to other meeting participants.

In one alternate embodiment, shown in FIG. 6, the video conferencing participant tries to make his or her own image look funny. There can be a variety of image transformations. For example, this could involve making one's face red or purple, adding a crown or a pair of eye glasses, and so on. In this embodiment, the image transformation module is added in place of the original make-up module described in the previous embodiments. For example, in the embodiment shown in FIG. 6, an image is input into a video conferencing participant's computing device 602 from a camera 604. The transformation module 608 for transforming the input image is inserted between the camera 604 and an encoding module 610. In this embodiment, the encoded output image is transmitted to one or more receiving video conference participants 612 over a network 616. The receiving participants 614 decode the transmitted encoded image via a decoder 620 to recover the video stream of the output image with the transformations applied to their display 624. Although this transformation is described relative to FIG. 6, the transformation module can equally well be substituted for the make-up modules in FIGS. 2B and 2C to accomplish transformation results in a manner similar to that described for these figures.

Figure 7:
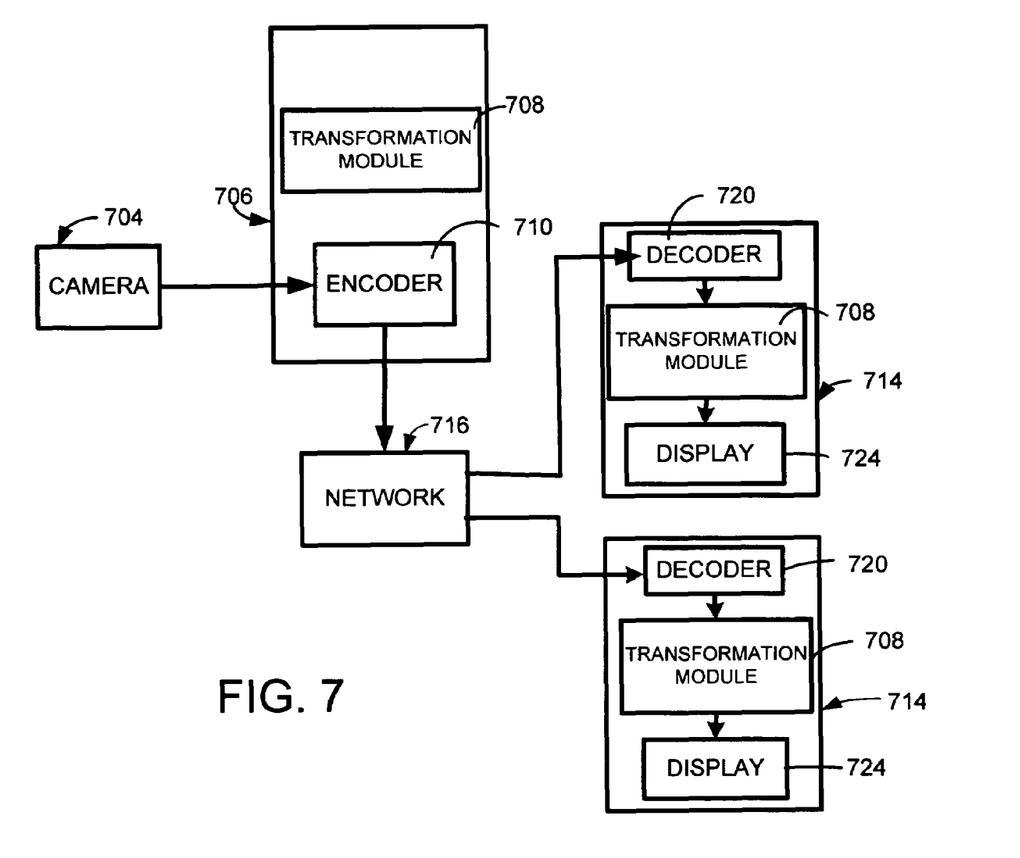
FIG. 7 is a schematic of an embodiment of a digital transformation system according to the invention wherein a face is transformed by other video conferencing participants.

In another embodiment, a particular remote participant tries to make another participant look funny to the other participants. In this case, the transformation module is inserted after the video stream is decoded for each participant. Step 1 (face location) is run on the PC of the participant who initiates the operation. Once the face region is known, its mask along with the command of the transformation is sent to every other participant, and Steps 2 and 3 (transformation and blending of the transformed image) are performed on every participant according the transformation command. For example, as shown in FIG. 7, a video frame is captured at the video conferencing participant with a camera 704 and input into this video conferencing participant's computing device 702. This video conferencing participant's computing device 702 finds the face and features to be used in the transformation and encodes this information as well as the transformation to be applied via an encoder 710. This video conferencing participant then transmits the encoded mask and transformation information to the other video conferencing participants 714 over a network 716. The input image is received at each video conferencing participant 714, decoded with a decoder 720, the transformation is applied using the mask and the transformation information at the receiving video conferencing participants 714 via a digital transformation module 708 and the output image is displayed at the display 724.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A process for applying digital make-up to an image frame used for face to face video conferencing, comprising the process actions of:
   inputting a video frame;
   processing said video frame to locate a face;
   finding the features of the face; and applying digital make-up to said face, with the exception of the eyes and any open mouth that is shown, to obtain a made-up image of said face.

2. The process of claim 1 wherein processing said video frame to locate a face, further comprises the process actions of:
separating the face from the background of the frame; and
modifying said background.

3. The process of claim 2 wherein modifying said background comprises one of a group comprising:
blurring the background;
modifying the background so that it is no longer visible;
deleting the background;
replacing the background with a different background; and
making the background all one pixel color.

4. The process of claim 1 further comprising the process actions of:
encoding said made-up image of said face; and
transmitting said made-up image of said face to other video conferencing participants.

5. The process of claim 1 wherein the face is located by using at least one of a group comprising:
a face detector,
edge detection, and
motion detection.

6. The process of claim 1 wherein the features of the face are the eyes and mouth and wherein these features are found by using at least one of a group comprising:
knowledge of face proportions;
template matching;
edge detection; and
corner detection.

7. The process of claim 1 wherein the process action of applying digital make-up comprises the process actions of:
applying a low pass filter to the face with the exception of the eyes and any open mouth that is shown.

8. The process of claim 1 wherein applying digital make-up comprises applying a low pass filter to the face.

9. The process of claim 1 wherein the process action of applying digital make-up comprises the process actions of:
applying a bilateral filter to the face.

10. The process of claim 1 wherein applying digital make-up comprises applying a contrast reduction filter to the face.

11. The process of claim 1 wherein the process action of applying digital make-up comprises the process actions of:
changing the color of some pixels of given areas of the face to enhance their color.

12. The process of claim 1 wherein the process actions are performed by a server who receives said input video frame from a video conferencing participant.

13. The process of claim 12 further comprising the process actions of:
the server encoding said made-up image of said face; and
the server transmitting said made-up image of said face to other video conferencing participants who display it.

14. The process of claim 1 wherein the input video frame is received at a meeting participant from another meeting participant.

15. A computer-readable medium having computer-executable instructions for performing the process recited in claim 1.

16. A system for transforming a face in an image frame used for face-to-face video conferencing, comprising
a general purpose computing device; and
a computer program comprising program modules executable by the computing device, wherein the computing device is directed by the program modules of the computer program to,
input a video frame;
process said video frame to identify a face, the area outside of the face comprising the background;
find the features of the face to identify areas that are not to be transformed;
apply a transformation to the features of the face that are not in the areas that are not to be transformed; and
blend the areas that are transformed with the areas that are not transformed.

17. The system of claim 16 wherein the module for applying the transformation applies digital make-up.

18. The system of claim 16 wherein the module for applying the transformation adds objects to the face.

19. A method for transforming an image of a video conference participant, comprising the process actions of:
inputting a video frame at a first video conferencing participant;
said first video conferencing participant locating a face and its features within the video frame;
said first video conferencing participant determining a transformation to be applied to said face;
said first video conferencing participant sending information as to the location of the face and the features as well as the transformation to be applied to one or more video conference participants; and
said one or more video conference participants applying said transformation to said video frame and blending the transformation with the video frame.

* * * * *